Patented Oct. 18, 1927.

1,646,048

UNITED STATES PATENT OFFICE.

ERNST WIRZ, OF BADEN, SWITZERLAND, ASSIGNOR TO AKTIENGESELLSCHAFT BROWN, BOVERI AND CIE., OF BADEN, SWITZERLAND.

AUTOMATIC REGULATING APPARATUS FOR ELECTRIC FURNACES.

Application filed April 21, 1925, Serial No. 24,859, and in Germany May 7, 1924.

Automatic regulating devices for electric furnaces are known wherein the electrodes are moved by a hydraulically actuated working piston and the pressure liquid is controlled by a valve dependent upon the current or the power taken by the electrodes. If in such a device the current in one electrode, for example, exceeds the desired value, the valve is opened in such a direction that the electrode is raised. The speed with which the electrode is raised must be rather great in order that excessive flow of current may not be permitted to persist too long. By suitably choosing the pressure of the working liquid and the cross-sectional area of the valve openings, the requisite speed can be easily obtained. With such provisions, however, when only a small variation of current occurs, which just suffices to actuate the control valve, the electrodes are raised with the same speed, and before the valve can be closed again they reach a position in which the current strength is much too small, and, under some circumstances, the arc even breaks altogether. Thus oscillations and overrunning in the regulating operations are produced.

According to the invention, this objection can be removed by constructing the control valve as a reducing valve and operating it by suitable automatic regulating means in accordance with the load requirements. By this means the result is obtained that, in the case of a small excess over the normal power or the normal current strength, only a small valve aperture is opened, while in the case of a large excess the valve aperture is larger. The speed of the working liquid flowing to or from the working cylinder, and with it the speed of movement of the electrode, is dependent, in the case of such a valve, upon the position of the valve. Thus the electrodes are raised more quickly if the current strength or power greatly exceeds the normal value and more slowly if this excess is only slight. Over-regulation and oscillations are thereby obviated.

The general object of the invention, therefore, is the provision of apparatus which will operate automatically to preserve close regulation of the electrode feed, and thereby increase the efficiency and dependability of the furnace.

Specific objects are the provision of a regulating gear which is simple in construction, reliable in operation and effective to control heavy pressures.

Other and further objects will be pointed out or indicated hereinafter, or will appear to those skilled in the art upon an understanding of the invention or its employment in practice.

In the accompanying drawings forming a part of this specification, I illustrate one manner in which the invention may be embodied in structure and applied in use, but it is to be understood that this is presented for purpose of illustration only, and that it is not to be accorded any interpretation calculated to limit the claims short of the true and most comprehensive scope of the invention in the art.

In said drawings.

Figure 1:
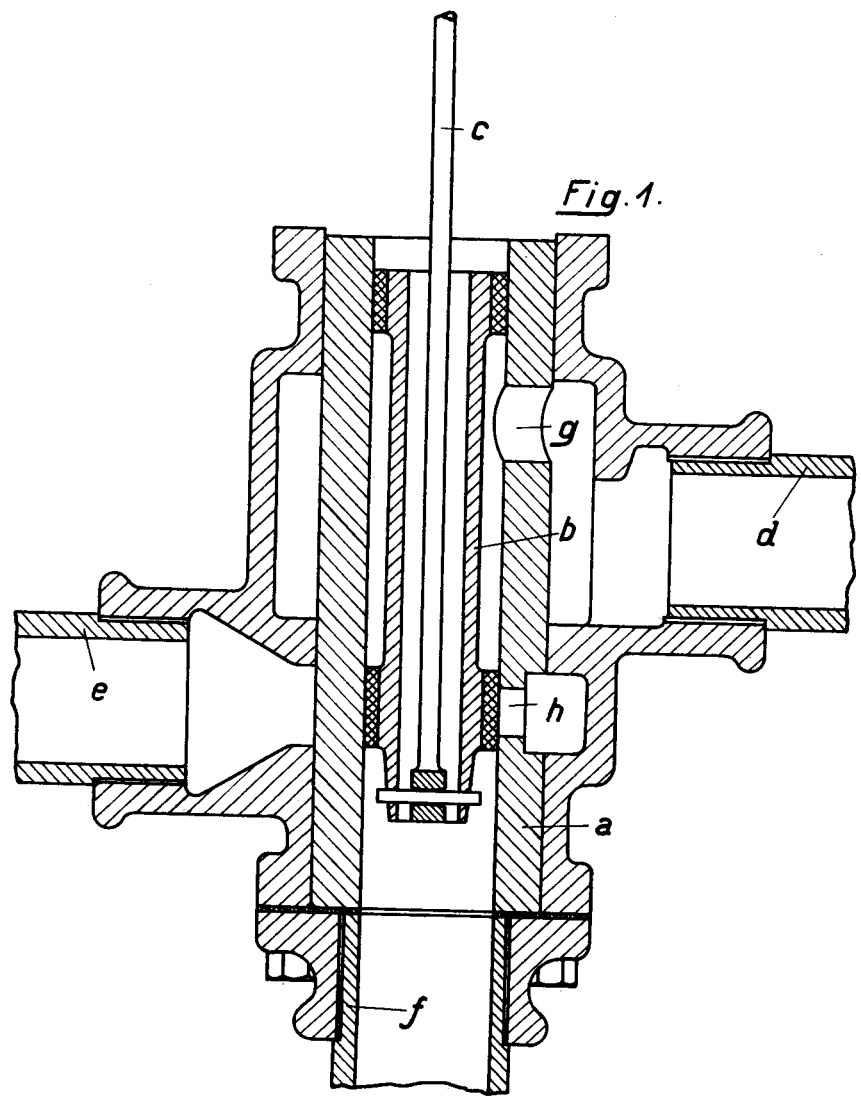
Fig. 1 is a sectional elevation of a regulating valve.
Figure 2:
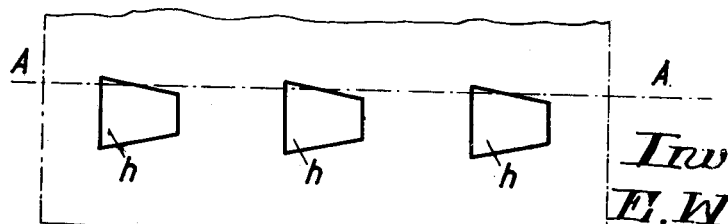
Fig. 2 is a development of the valve cylinder surface, showing the form of the valve apertures.
Figure 3:
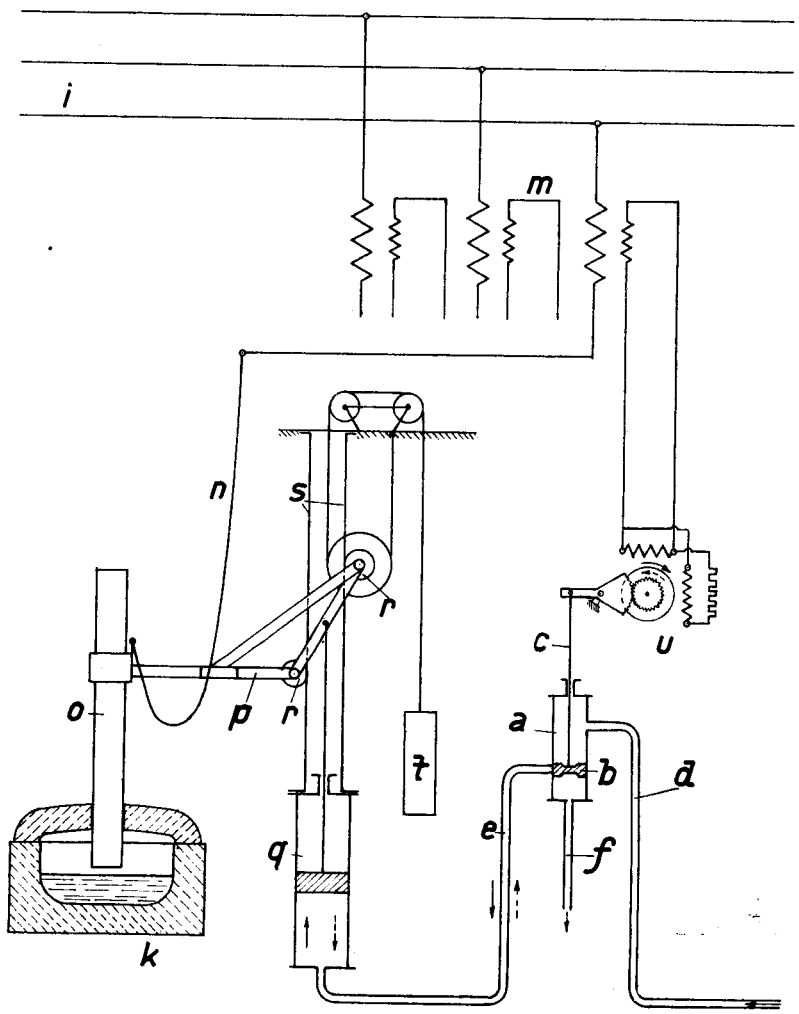
Fig. 3 is a diagrammatic illustration showing the connection of a control apparatus to a furnace and the supply lines.

Figure 1 shows, by way of example, a valve applicable to this purpose. In this figure $a$ is the valve bush or liner, $b$ the valve piston, $c$ the valve rod, $d$ the pressure water pipe, $e$ the pipe leading to the working cylinder, $f$ the discharge pipe. If the valve piston is pressed downwards, the pressure water from the pipe $d$ can pass through the aperture $g$ in the valve liner and through the controlled apertures $h$ into the pipe $e$ and raise the electrodes. If, on the other hand, the valve piston moves upwards, the pressure water can escape from the working cylinder through the pipe $e$ and the apertures $h$ into the discharge pipe $f$. Figure 2 shows a development of the surface of the valve seat with the apertures $h$ in the valve liner which are controlled by the valve. It will be seen that the boundary lines of these apertures do not run parallel to the edge of the surface of the valve seat. In the case of a small downward displacement of the valve piston from the mid-position, the upper bounding edge of the valve seat surface comes into the position A—A and thereby releases only quite small passage openings at the corners of the trapezoidal apertures $h$ so that the electrodes cannot be raised too quickly. According to the form of the valve ports $h$, the flow passage increases in accordance with the extent of movement of the piston. A like effect for controlling exhaust of actuating fluid from the cylinder $q$ is obtained if the movement of the piston is in the upward direction so that the valve ports are opened at the bottom.

For the complete utilization of the advantages obtained by the invention it is necessary for the control valve to be actuated, in a manner known in itself, by an electromagnetic regulator which acts directly upon the valve without any sort of intermediate mechanism for compounding the movement, for only by this means is it possible, in the event of a small variation of the current or power from its normal value, to return the valve to its position of rest so quickly that no over-regulation occurs.

In this drawing, $i$ is the three-phase network, from which the furnace $k$ is fed through a series transformer $m$ and the supply cable $n$. In order to avoid complication of the drawing, one only of the three electrodes and their regulating apparatus is shown. The electrode $o$ is mounted on the carrier $p$, which is guided on the bars $s$ by means of rollers $r$. The bars $s$ are erected on the hydraulic cylinder $q$, the piston of which, through the intermediary of the carrier $p$, moves the electrode $o$ which is balanced by the counterweight $t$. The cylinder $q$ is connected by the pipe $e$ with the control valve $a$, the piston valve $b$ of which is controlled by means of the rod $c$ from the electric rotary governor $u$. The governor shown as an example is constructed according to the well known Ferrari principle and is fed from the secondary winding of the series transformer $m$.

What I claim is:—

1. Automatic regulating apparatus for electric furnaces of the movable electrode type including hydraulic means for adjusting the position of the electrodes, an electric governor connected to a valve controlling the supply of the hydraulic medium to said hydraulic means, the operative area of the valve port per unit of travel of the valve being graded, i. e. dependent on the position of the valve.

2. In electric furnace apparatus, electrode feed regulating gear comprising hydraulic means for positioning the electrode, a valve for regulating the rate of supply of actuating fluid to said hydraulic means, and an automatic regulating device responsive to variations of load on the electrode for operating said valve.

3. In electric furnace apparatus, electrode positioning gear comprising hydraulic means for operating the electrode, a valve for controlling flow of liquid to and from said hydraulic means, said valve operable to effect variation in the rate of supply of such liquid, and a regulator responsive to variation of load conditions on the electrode for positioning the valve.

4. In electric furnace apparatus, electrode control gear comprising hydraulic means for positioning the electrode, a regulator responsive automatically to variations of load on the electrode, and a valve responsive to the regulator for varying the rate of supply and relief of actuating liquid in accordance with operation of the regulator.

5. In electric furnace apparatus, electrode control gear comprising hydraulic means for positioning the electrode, a variable-flow valve for controlling the hydraulic means, and a regulator responsive to load variations on the electrode for positioning the valve.

6. In electric furnace apparatus, electrode control gear comprising hydraulic means for positioning the electrode and automatic means for varying the speed of operation of the hydraulic means in accordance with variations of load on the electrode.

In testimony whereof I have signed my name to this specification.

ERNST WIRZ.